US011803116B2

(12) United States Patent
Peng et al.

(10) Patent No.: US 11,803,116 B2
(45) Date of Patent: Oct. 31, 2023

(54) ILLUMINATION SYSTEM AND PROJECTION APPARATUS

(71) Applicant: Coretronic Corporation, Hsin-Chu (TW)

(72) Inventors: Ken-Teng Peng, Hsin-Chu (TW); Wei-Hao Chen, Hsin-Chu (TW); Kuo-Hsuan Fan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/720,299

(22) Filed: Apr. 14, 2022

(65) Prior Publication Data
US 2022/0342289 A1    Oct. 27, 2022

(30) Foreign Application Priority Data

Apr. 26, 2021   (CN) .................. 202110451093.X

(51) Int. Cl.
*G03B 21/20*    (2006.01)
*G02B 26/00*    (2006.01)
(52) U.S. Cl.
CPC ......... *G03B 21/204* (2013.01); *G02B 26/008* (2013.01); *G03B 21/208* (2013.01); *G03B 21/2066* (2013.01)
(58) Field of Classification Search
None
See application file for complete search history.

(56) References Cited

U.S. PATENT DOCUMENTS 9,618,737 B2    4/2017   Khan et al.
2020/0209726 A1*  7/2020   Lin .................... G03B 21/2066

FOREIGN PATENT DOCUMENTS

CN          105431776       8/2017
CN          108279548       7/2018

* cited by examiner

*Primary Examiner* — Bao-Luan Q Le
*Assistant Examiner* — Danell L Owens
(74) *Attorney, Agent, or Firm* — JCIPRNET

(57)   ABSTRACT

An illumination system configured to provide an illumination beam is provided and includes a light-source module and a first and a second wavelength conversion devices. The light-source module provides a first and a second excitation beams. The first wavelength conversion device is disposed on a path of the first excitation beam and has first regions and at least one first boundary disposed between every two adjacent first regions. The second wavelength conversion device is disposed on a path of the second excitation beam and has second regions and at least one second boundary disposed between every two adjacent second regions. The second regions correspond to the first regions. A time point when the first boundary gets into the path of the first excitation beam is different from a time point when the second boundary gets into the path of the second excitation beam. A projection apparatus is also provided.

11 Claims, 4 Drawing Sheets

ILLUMINATION SYSTEM AND PROJECTION APPARATUS

CROSS-REFERENCE TO RELATED APPLICATION

This application claims the priority benefit of China application serial no. 202110451093.X, filed on Apr. 26, 2021. The entirety of the above-mentioned patent application is hereby incorporated by reference herein and made a part of this specification.

BACKGROUND

Technical Field

The disclosure relates to an illumination system and a projection apparatus.

Description of Related Art

In a digital light processing (DLP) projection apparatus, the digital micromirror device (DMD) acts as the core device for control. Further, for instance, a blue excitation beam (blue laser beam) may act as the light source, beams of other colors may be produced through a rotating wheel (e.g., a wavelength conversion wheel or a color wheel), and the required color sequence is integrated and is provided to the DMD to sequentially output image beams.

The rotating wheel includes regions of different colors, which correspond to beams of different colors being produced. Nevertheless, when one boundary between two adjacent regions of different colors gets into the path of the blue excitation beam, one portion of the blue excitation beam irradiates one region of the rotating wheel, and the other portion of the blue excitation beam irradiates another region of the rotating wheel (the blue excitation beam irradiates the two adjacent regions of different colors at the same time), so spoke occurs in the projection image.

In the related art, when the boundary gets into the path of the blue excitation beam, beam output is suspended to prevent the as-mentioned spoke from occurring. For a rotating wheel having six regions, the detriment to the output light caused by suspending light output for a certain period of time may be up to 20%. Therefore, development of a projection apparatus capable of preventing the detriment to the output light from occurring is an important issue.

The information disclosed in this BACKGROUND section is only for enhancement of understanding of the background of the described technology and therefore it may contain information that does not form the prior art that is already known to a person of ordinary skill in the art. Further, the information disclosed in the BACKGROUND section does not mean that one or more problems to be resolved by one or more embodiments of the disclosure was acknowledged by a person of ordinary skill in the art.

SUMMARY

The disclosure provides an illumination system capable of outputting an illumination beam having stable intensity. The disclosure further provides a projection apparatus providing good display quality.

According to an embodiment of the disclosure, an illumination system is provided. The illumination system is configured to provide an illumination beam and includes a light-source module, a first wavelength conversion device, and a second wavelength conversion device. The light-source module provides a first excitation beam and a second excitation beam. The first wavelength conversion device is disposed on a path of the first excitation beam and is disposed to rotate around a first rotating axis. A surface of the first wavelength conversion device perpendicular to the first rotating axis has a plurality of first regions, and at least one first boundary is disposed between the first regions. The second wavelength conversion device is disposed on a path of the second excitation beam and is disposed to rotate around a second rotating axis. A surface of the second wavelength conversion device perpendicular to the second rotating axis has a plurality of second regions, the second regions correspond to the first regions, and at least one second boundary is disposed between the second regions. The at least one first boundary gets into the path of the first excitation beam at a first time point, and the at least one second boundary gets into the path of the second excitation beam at a second time point. A delay time exists between the first time point and the second time point.

According to an embodiment of the disclosure, a projection apparatus is provided. The projection apparatus includes the illumination system, a light valve, and a projection lens. The light valve is disposed on a path of the illumination beam and is configured to convert the illumination beam into an image beam. The projection lens is disposed on a transmission path of the image beam and is configured to project the image beam out of the projection apparatus.

To sum up, the first wavelength conversion device and the second wavelength conversion device corresponding to each other are suitably disposed in the illumination system and the projection apparatus provided by the embodiments of the disclosure. The first boundary of the first wavelength conversion device gets into the path of the first excitation beam at the first time point, and the second boundary of the second wavelength conversion device gets into the path of the second excitation beam at the second time point. The delay time exists between the first time point and the second time point. In other words, the detriment to the output light can be resolved by preventing the first boundary of the first wavelength conversion device and the second boundary of the second wavelength conversion device from getting into the paths of the first excitation beam and the second excitation beam at the same time. As such, when the first boundary of the first wavelength conversion device gets into the path of the first excitation beam, compensation may be made through the second wavelength conversion device, and vice versa. Therefore, in the embodiments of the disclosure, the illumination system may provide an illumination beam having stable intensity, and the projection apparatus may provide good display quality.

To make the aforementioned more comprehensible, several embodiments accompanied with drawings are described in detail as follows.

Other objectives, features and advantages of the disclosure will be further understood from the further technological features disclosed by the embodiments of the disclosure wherein there are shown and described preferred embodiments of the disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
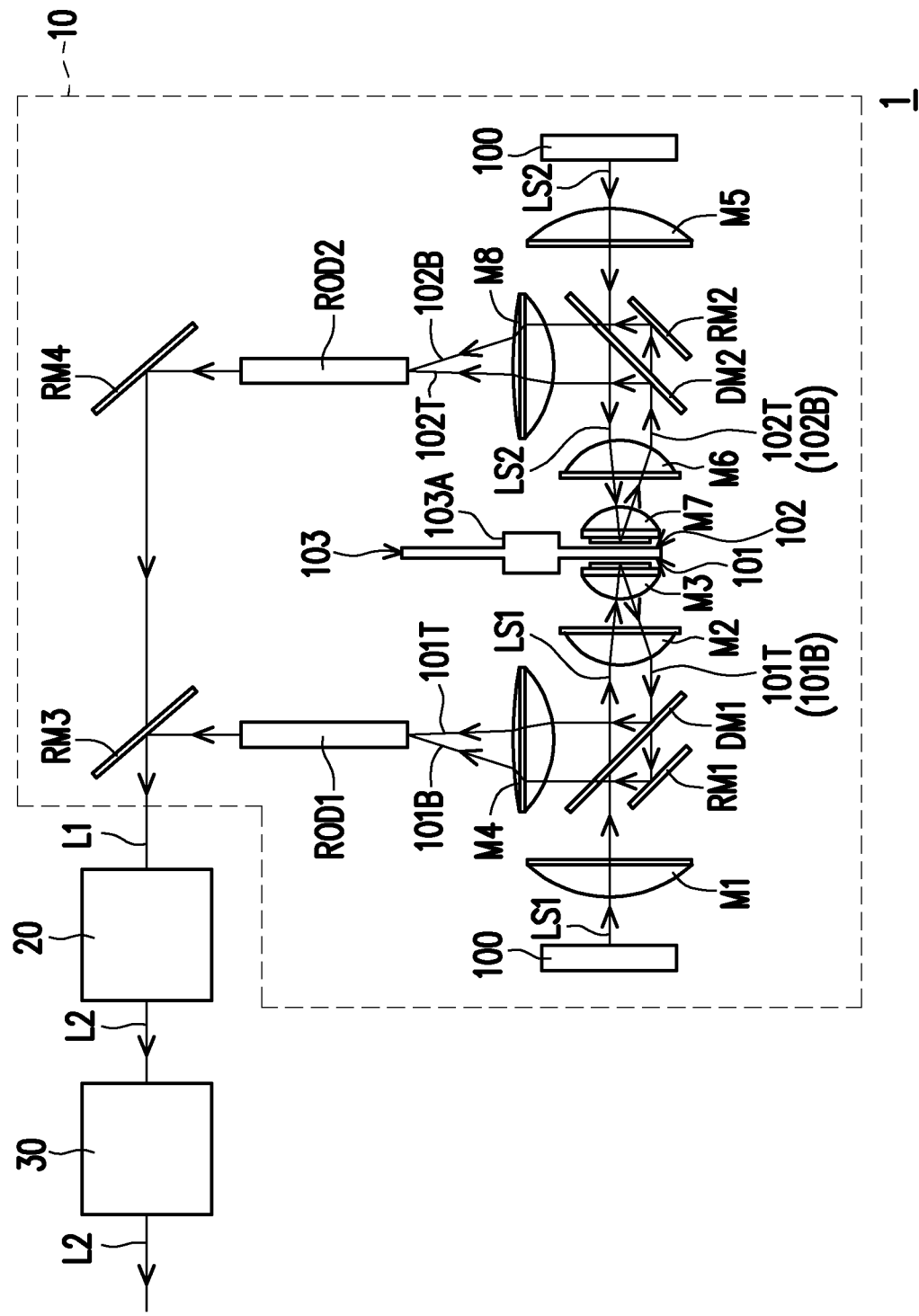
FIG. 1A is a schematic diagram of a configuration of a projection apparatus according to an embodiment of the disclosure.

FIG. 1A is a schematic diagram of a configuration of a projection apparatus according to an embodiment of the disclosure. A projection apparatus 1 includes an illumination system 10, a light valve 20, and a projection lens 30. The illumination system 10 is configured to provide an illumination beam L1, and the light valve 20 is disposed on a path of the illumination beam L1 and is configured to convert the illumination beam L1 into an image beam L2. The projection lens 30 is disposed on a transmission path of the image beam L2 and is configured to project the image beam L2 out of the projection apparatus 1.

The illumination system 10 includes a light-source module 100, a first wavelength conversion device 101, and a second wavelength conversion device 102. In this embodiment, the first wavelength conversion device 101 and the second wavelength conversion device 102 are disposed on two opposite surfaces of a rotating wheel 103, but the disclosure is not limited thereto. According to an embodiment of the disclosure, the first wavelength conversion device 101 and the second wavelength conversion device 102 may be separately disposed on different rotating wheels, and the first wavelength conversion device 101 and the second wavelength conversion device 102 are, for example, phosphor wheels.

In this embodiment, a number of the light-source module 100 is, for example, 2, and the two light-source modules 100 respectively provide a first excitation beam LS1 and a second excitation beam LS2. Optical properties of the first excitation beam LS1 are identical to that of the second excitation beam LS2, but the disclosure is not limited thereto. According to an embodiment of the disclosure, the light-source module 100 may include a beam splitter configured to split light from a single light source in the light-source module 100 into the first excitation beam LS1 and the second excitation beam LS2 (for example, the beam splitter can change the direction of light beam so as to provide first excitation beam LS1 and the second excitation beam LS2). The first wavelength conversion device 101 is disposed on a path of the first excitation beam LS1, and the second wavelength conversion device 102 is disposed on a path of the second excitation beam LS2.

Figure 1B:
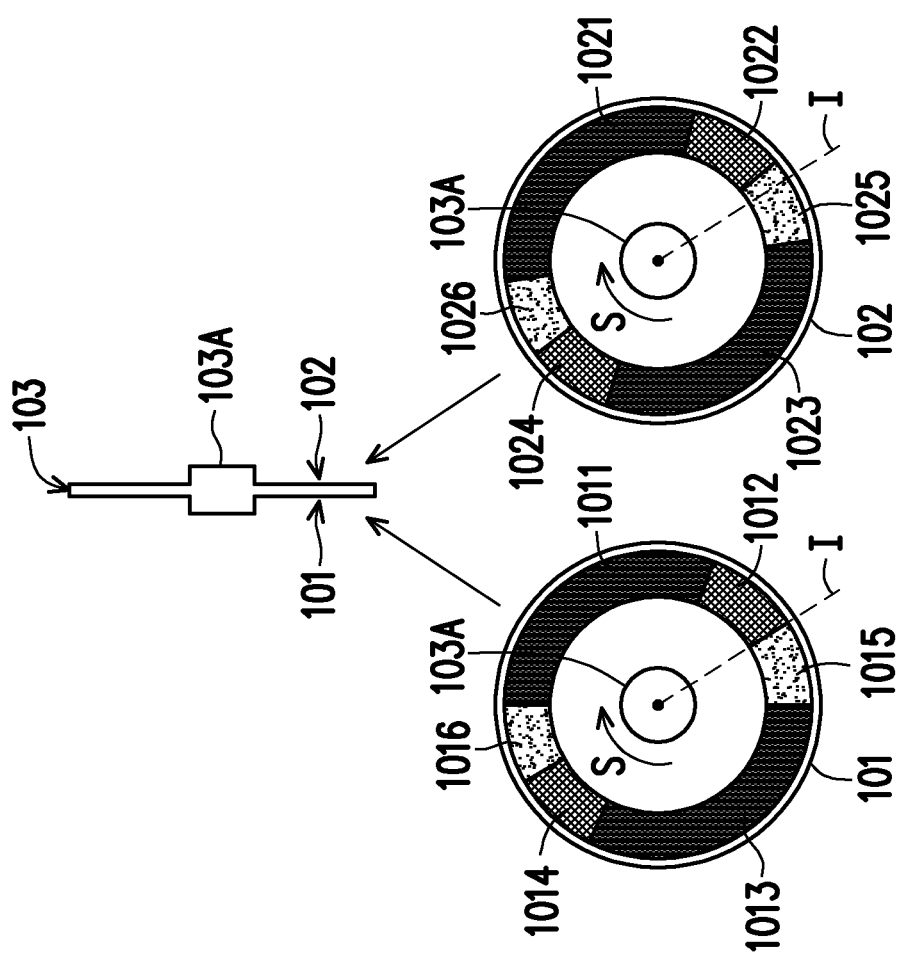
FIG. 1B is a schematic side view illustrating a first wavelength conversion device and a second wavelength conversion device disposed on two opposite surfaces of a rotating wheel in FIG. 1A.

Refer to FIG. 1B, which is a schematic side view illustrating the first wavelength conversion device and the second wavelength conversion device disposed on two opposite surfaces of the rotating wheel in FIG. 1A. In this embodiment, the first wavelength conversion device 101 and the second wavelength conversion device 102 are disposed on two opposite surfaces of the rotating wheel 103. As such, both the first wavelength conversion device 101 and the second wavelength conversion device 102 rotate around a rotating axis 103A of the rotating wheel 103, and rotating speeds of the first wavelength conversion device 101 and the second wavelength conversion device 102 are identical, but the disclosure is not limited thereto. In other embodiments, the first wavelength conversion device 101 and the second wavelength conversion device 102 may be separately disposed on different rotating wheels. The first wavelength conversion device 101 rotates around one rotating axis, the second wavelength conversion device 102 rotates around another rotating axis, and the rotating speeds are identical. In this embodiment, the two surfaces of the rotating wheel 103 on which the first wavelength conversion device 101 and the second wavelength conversion device 102 are disposed are, for example, reflective surfaces, and are adapted to reflect beams (e.g., excitation beams or conversion beams) transmitted via the first wavelength conversion device 101 and the second wavelength conversion device 102, but the disclosure is not limited thereto. In other embodiments, the first wavelength conversion device 101 and the second wavelength conversion device 102 may selectively include a reflective layer. The reflective layer of the first wavelength conversion device 101 is disposed on a surface of the first wavelength conversion device 101 close to the rotating wheel 103, and the reflective layer of the second wavelength conversion device 102 is disposed on a surface of the second wavelength conversion device 102 close to the rotating wheel 103.

As shown in FIG. 1B, a surface of the first wavelength conversion device 101 perpendicular to the rotating axis 103A has a plurality of first regions. These first regions are arranged in a ring shape around the rotating axis 103A and respectively are color conversion regions 1011 to 1014 and excitation light reflection regions 1015 and 1016. Several boundaries (i.e., the first boundaries) are provided between every two adjacent first regions among these six first regions. Similarly, a surface of the second wavelength conversion device 102 perpendicular to the rotating axis 103A has a plurality of second regions. These second regions are arranged in a ring shape around the rotating axis 103A and respectively are color conversion regions 1021 to 1024 and excitation light reflection regions 1025 and 1026. Several boundaries (i.e., the second boundaries) are provided between every two adjacent second regions among these six second regions. It is noted that each wavelength conversion device, as an example, has four color conversion regions and two excitation light reflection regions in this embodiment, but the disclosure is not limited thereto. In other embodiments of the disclosure, each of the first wavelength conversion device 101 and the second wavelength conversion device 102 has at least one color conversion region and at least one excitation light reflection region.

It is noted that the color conversion regions 1011 to 1014 of the first wavelength conversion device 101 respectively correspond to the color conversion regions 1021 to 1024 of the second wavelength conversion device 102 in this embodiment, wherein the color conversion region 1011 of the first wavelength conversion device 101 corresponds to the color conversion region 1021 of the second wavelength conversion device 102, the color conversion region 1012 of the first wavelength conversion device 101 corresponds to the color conversion region 1022 of the second wavelength conversion device 102, and the rest may be deduced by analogy. Herein, the corresponding color conversion regions have a same arc length on the wavelength conversion devices to which the corresponding color conversion regions belong, but the disclosure is not limited thereto. For example, the color conversion region 1011 and the color conversion region 1021 have the same arc length. Further, when the corresponding color conversion regions respectively get into the paths of the first excitation beam LS1 and the second excitation beam LS2 having the same optical property, converted beams of the same color are produced.

Note that in order to clearly depict a misaligned configuration to be described below, the side views of the first wavelength conversion device 101 and the second wavelength conversion device 102 shown in the lower part of FIG. 1B are viewed from the same side and at the same viewing angle (viewed from the left side towards the right side of the drawing or viewed from the right side towards the left side of the drawing, e.g., one is a front schematic view, and the other is a rear schematic view). The first wavelength conversion device 101 is provided with the color conversion region 1011, the color conversion region 1012, the excitation light reflection region 1015, the color conversion region 1013, the color conversion region 1014, and the excitation light reflection region 1016 arranged in sequence in a rotating direction S. The second wavelength conversion device 102 is provided with the color conversion region 1021, the color conversion region 1022, the excitation light reflection region 1025, the color conversion region 1023, the color conversion region 1024, and the excitation light reflection region 1026 arranged in sequence in the rotating direction S. It thus can be seen that both the first wavelength conversion device 101 and the second wavelength conversion device 102 have a same pattern configuration. Further, according to the marked dashed line I as a reference line, the first wavelength conversion device 101 and the second wavelength conversion device 102 are arranged in a misaligned configuration, and a relative misalignment angle is, for example, 12°. For instance, the misalignment angle between the color conversion region 1011 and the corresponding color conversion region 1021 is 12°, but the disclosure is not limited thereto. Note that a position where the dashed line I overlaps the first wavelength conversion device 101 is, for example, located in a region (or a predetermined region) where the first excitation beam LS1 irradiates the first wavelength conversion device 101, but the disclosure is not limited thereto.

With reference to FIG. 1A, the illumination system 10 may further include lens elements M1 to M8, a first dichroic mirror DM1, a second dichroic mirror DM2, reflective mirrors RM1 to RM4, a first light homogenizer ROD1, and a second light homogenizer ROD2. Herein, the first dichroic mirror DM1 and the second dichroic mirror DM2 may respectively transmit the first excitation beam LS1 and the second excitation beam LS2 and may reflect the converted beams respectively produced through the color conversion regions 1011 to 1014 and the color conversion regions 1021 to 1024. To be specific, in this embodiment, the first excitation beam LS1 and the second excitation beam LS2 are blue excitation beams (shown as blue light B). The color conversion regions 1011 to 1014 and the color conversion regions 1021 to 1024 are provided with phosphors. When the above-mentioned color conversion regions get into the paths of the blue excitation beams, converted beams including light of red light spectrum and converted beams including light of green light spectrum may be respectively produced. The first dichroic mirror DM1 is disposed on the path of the first excitation beam LS1 and the path of the converted beams produced through the color conversion regions 1011 to 1014, and the second dichroic mirror DM2 is disposed on the path of the second excitation beam LS2 and the path of the converted beams produced through the color conversion regions 1021 to 1024. The first dichroic mirror DM1 and the second dichroic mirror DM2 may transmit blue light and reflect red light and green light.

With reference to FIG. 1A, generation of the illumination beam L1 by the illumination system 10 is described in detail as follows.

In this embodiment, generation of the illumination beam L1 through an element group on the left side of FIG. 1A is described first, wherein the element group includes the lens element M1, the reflective mirror RM1, the first dichroic mirror DM1, the lens element M2, the lens element M3, the first wavelength conversion device 101, the lens element M4, the first light homogenizer ROD1, and the reflective mirror RM3.

The first excitation beam LS1 generated by the light-source module 100 is a blue excitation beam. The lens element M1 is configured to transmit the first excitation beam LS1 first. Since the first dichroic mirror DM1 may be configured to transmit blue light, the first dichroic mirror DM1 may transmit the first excitation beam LS1 and then the lens elements M2 and M3 transmit the first excitation beam LS1 in sequence. The first excitation beam LS1 irradiates the first wavelength conversion device 101. The first wavelength conversion device 101 is configured to rotate around the rotating axis 103A, so that the color conversion region 1011, the color conversion region 1012, the excitation light reflection region 1015, the color conversion region 1013, the color conversion region 1014, and the excitation light reflection region 1016 disposed thereon may get into the path of the first excitation beam LS1 in sequence. Herein, when the color conversion regions 1011 to 1014 get into the path of the first excitation beam LS1, a converted beam 101T is produced. When the excitation light reflection regions 1015 and 1016 get into the path of the first excitation beam LS1, the first excitation beam LS1 is reflected. For ease of distinction, the first excitation beam LS1 reflected by the excitation light reflection regions 1015 and 1016 is marked as an excitation beam 101B.

Since the first dichroic mirror DM1 is configured to reflect red light and green light, red light R and green light G in the converted beam 101T may be reflected by the first dichroic mirror DM1 and may be transmitted via the lens element M4, be transmitted through the first light homogenizer ROD1, reflected by the reflective mirror RM3 in sequence, and thereby be outputted from the illumination system 10. On the other hand, since the first dichroic mirror DM1 is configured to transmit blue light, the excitation beam 101B may be transmitted via the first dichroic mirror DM1 and then be reflected by the reflective mirror RM1, be transmitted via the first dichroic mirror DM1 again, be transmitted via the lens element M4, be transmitted through the first light homogenizer ROD1, be reflected by the reflective mirror RM3 in sequence, and thereby be outputted from the illumination system 10.

In an embodiment of the disclosure, in FIG. 1A, the upper portion of the first dichroic mirror DM1 is configured to substantially completely transmit blue light and substantially completely reflect red light and green light. The lower portion of the first dichroic mirror DM1 is configured to partially transmit and reflect the blue light and substantially completely reflect the red light and green light. Therefore, a portion of the excitation beam 101B is allowed to be reflected by the lower portion of the first dichroic mirror DM1 and be transmitted via the lens element M4, be transmitted through the first light homogenizer ROD1, be reflected by the reflective mirror RM3 in sequence, and thereby be outputted from the illumination system 10. The other portion of the excitation beam 101B may be transmitted via the lower portion of the first dichroic mirror DM1, be reflected by the reflective mirror RM1, be transmitted via the upper portion of the first dichroic mirror DM1, be transmitted via the lens element M4, be transmitted through the first light homogenizer ROD1, be reflected by the reflective mirror RM3 in sequence, and thereby be outputted from the illumination system 10. Similarly, since the configuration of the second dichroic mirror DM2 is identical to that of the first dichroic mirror DM1, and redundant description is omitted.

As described above, due to the rotation of the first wavelength conversion device 101, the illumination system 10 may output a light beam (shown as the green light G) corresponding to the color of the color conversion region 1011, a light beam (shown as the red light R) corresponding to the color of the color conversion region 1012, the blue light B reflected by the excitation light reflection region 1015, a light beam (shown as the green light G, the same as the color of the light beam corresponding to the color conversion region 1011, for example) corresponding to the color of the color conversion region 1013, a light beam (shown as the red light R) corresponding to the color of the color conversion region 1014, and the blue light B reflected by the excitation light reflection region 1016 in sequence via the element group on the left side of FIG. 1A and periodically repeats the foregoing process.

The first wavelength conversion device 101 and the second wavelength conversion device 102 have the same pattern configuration, and the first wavelength conversion device 101 and the second wavelength conversion device 102 are disposed on two opposites surfaces of the rotating wheel 103. As such, the foregoing process for generating the illumination beam L1 through the element group (including the lens element M1, the reflective mirror RM1, the first dichroic mirror DM1, the lens element M2, the lens element M3, the first wavelength conversion device 101, the lens element M4, the first light homogenizer ROD1, and the reflective mirror RM3) on the left side of FIG. 1A may also occur on the element group (including the lens element M5, the reflective mirror RM2, the second dichroic mirror DM2, the lens element M6, the lens element M7, the second wavelength conversion device 102, the lens element M8, the second light homogenizer ROD2, and the reflective mirror RM4) on the right side of FIG. 1A, so as to produce the converted beam 102T and the blue excitation beam 102B outputted from the illumination system 10. To be specific, due to the rotation of the second wavelength conversion device 102, the illumination system 10 may output a light beam (shown as the green light G) corresponding to the color of the color conversion region 1021, a light beam (shown as the red light R) corresponding to the color of the color conversion region 1022, the blue light B reflected by the excitation light reflection region 1025, a light beam (shown as the green light G, the same as the color of the beam corresponding to the color conversion region 1021, for example) corresponding to the color of the color conversion region 1023, a light beam (shown as the red light R) corresponding to the color of the color conversion region 1024, and the blue light B reflected by the excitation light reflection region 1026 in sequence via the element group on the right side of FIG. 1A and periodically repeats the foregoing process. The beams generated by the element group on the left side of FIG. 1A and the beams generated by the element group on the right side of FIG. 1A are integrated to form the illumination beam L1.

Figure 2:
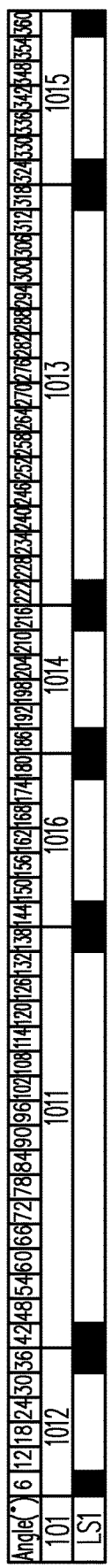
FIG. 2 is a graph of a relationship between the first excitation beam and the first wavelength conversion device in FIG. 1A according to an embodiment of the disclosure.

Refer to FIG. 1A, FIG. 1B, and FIG. 2 together. FIG. 2 is the graph of the relationship between the first excitation beam and the first wavelength conversion device in FIG. 1A according to an embodiment of the disclosure. To be specific, the dotted line I on the first wavelength conversion device 101 in FIG. 1B is treated as a position where an angle value is 0° in FIG. 2, and every 6° is treated as a unit interval to mark the color conversion regions 1011 to 1014 and the excitation light reflection regions 1015 and 1016 on the first wavelength conversion device 101. For instance, an angle mark 6° indicates the unit interval of the angle value from 0° to 6°. In FIG. 2, it is further indicated that when each unit interval gets into the path of the first excitation beam LS1 (or a predetermined path of the first excitation beam LS1) (for example, when each unit interval reaches the dashed line I due to the rotation of the first wavelength conversion device 101), whether or not the light-source module 100 provides the first excitation beam LS1. As shown in FIG. 2, in this embodiment, when the boundaries between every two adjacent first regions among the above first regions get into the path of the first excitation beam LS1, the light-source module 100 does not emit the first excitation beam LS1. For instance, when the boundary between the color conversion region 1012 and the color conversion region 1011 gets into the path of the first excitation beam LS1, the light-source module 100 does not emit the first excitation beam LS1 to avoid spoke. In detail, the first excitation beam LS1 is suspended when both the previous unit interval (e.g., angle mark 36°) and the next unit interval (e.g., angle mark 42°) get into the path of the first excitation beam LS1. Therefore, it can be seen that in FIG. 2, the first excitation beam LS1 is not provided when those boundaries (marked in black) get into the path of the first excitation beam LS1.

Figure 3:
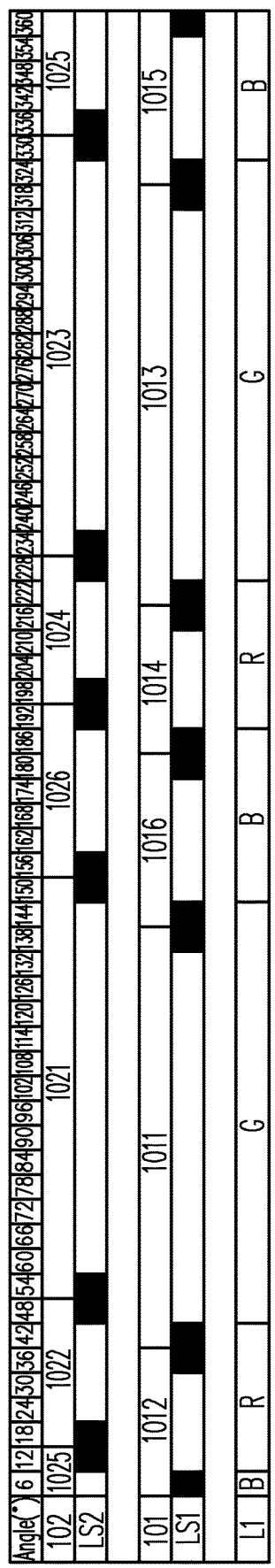
FIG. 3 is a graph of relationships among the first excitation beam, the first wavelength conversion device, the second excitation beam, the second wavelength conversion device, and an illumination beam in FIG. 1A according to an embodiment of the disclosure.

With reference to FIG. 1A, FIG. 1B, and FIG. 3 together, FIG. 3 is a graph of relationships among the first excitation beam, the first wavelength conversion device, the second excitation beam, the second wavelength conversion device, and the illumination beam in FIG. 1A according to an embodiment of the disclosure. As described above, the first wavelength conversion device 101 and the second wavelength conversion device 102 are arranged in a misaligned configuration, and the misalignment angle is, for example, 12°. For instance, the color conversion region 1011 is disposed in an angle interval of 36° to 138°, and the color conversion region 1021 corresponding to the color conversion region 1011 is disposed in an angle interval of 48° to 150°. Therefore, in FIG. 3, it can be seen that the color conversion regions 1011 to 1014 and the excitation light reflection regions 1015 and 1016 on the first wavelength conversion device 101 and the color conversion regions 1021 to 1024 and the excitation light reflection regions 1025 and 1026 on the second wavelength conversion device 102 are misaligned by 12°. In addition, similarly, when the boundaries between every two adjacent second regions on the second wavelength conversion device 102 get into the path of the second excitation beam LS2, the light-source module 100 does not emit the second excitation beam LS2 to avoid spoke. In other words, the light-source module 100 does not emit the second excitation beam LS2. Therefore, it can be seen that in FIG. 3, the second excitation beam LS2 is not provided (marked in black) for the aforementioned boundaries.

With reference to FIG. 3, it can be seen that a delay time is provided between a time point when a boundary on the first wavelength conversion device 101 gets into the path of the first excitation beam LS1 and a time point when a boundary on the second wavelength conversion device 102 gets into the path of the second excitation beam LS2. In other words, the suspension of the first excitation beam LS1 for the corresponding unit intervals of the first wavelength conversion device 101 and the suspension of the second excitation beam LS2 for the corresponding unit intervals of the second wavelength conversion device 102 does not occur simultaneously. Therefore, the time point when the first excitation beam LS1 is not provided is different from the time point when the second excitation beam LS2 is not provided, and the suspension of the first excitation beam LS1 and the suspension of the second excitation beam LS2 do not occur at the same time. At any time point, there is the illumination beam L1 outputted from the illumination system 10. The illumination beam L1 may correspondingly be a red light R, a green light G, and a blue light B based on which first region (and second region) getting into the path of the first excitation beam LS1 (and the second excitation beam LS2).

Further, in an embodiment of the disclosure, when the light-source module 100 does not emit the first excitation beam LS1 (as shown at the angle marks 36° and 42° in FIG. 3), intensity of the second excitation beam LS2 may increase, so that power of the illumination beam L1 may not be lowered due to the suspension of the first excitation beam LS1. In other words, when the first wavelength conversion device 101 rotates to a unit interval in which the output of the first excitation beam LS1 is suspended, compensation may be made through the second wavelength conversion device 102, which has misaligned pattern configuration.

Similarly, when the light-source module 100 does not emit the second excitation beam LS2 (as shown at the angle marks 48° and 54° in FIG. 3), intensity of the first excitation beam LS1 may increase, so that the power of the illumination beam L1 may not be lowered due to the suspension of the second excitation beam LS2. In other words, when the second wavelength conversion device 102 rotates to a unit interval in which the output of the second excitation beam LS2 is suspended, compensation may be made through the first wavelength conversion device 101. Through the complementary relationship of the first wavelength conversion device 101, the second wavelength conversion device 102 and the action (turned on/off) of the light-source module 100 which emits the first excitation beam LS1 and the second excitation beam LS2 correspondingly, the illumination beam L1 outputted by the illumination system 10 may exhibit stable intensity, and the projection apparatus 1 may thus provide good display quality.

In view of the foregoing, the first wavelength conversion device and the second wavelength conversion device corresponding to each other are suitably disposed in the illumination system and the projection apparatus provided by the embodiments of the disclosure. The complementary relationship of the first wavelength conversion device, the second wavelength conversion device and the action (turned on/off) of the light-source module 100 may be used to prevent occurrence of spoke. The light output from the first wavelength conversion device and the second wavelength conversion device are complementary. Therefore, in the embodiments of the disclosure, the illumination system may provide an illumination beam exhibiting stable intensity, and the projection apparatus may provide good display quality.

The above are exemplary embodiments of the disclosure and should not be construed as limitations to the scope of the disclosure. That is, any simple change or modification made based on the claims and specification of the disclosure falls within the scope of the disclosure. Any of the embodiments or any of the claims of the disclosure does not necessarily achieve all of the advantages or features disclosed by the disclosure. Moreover, the abstract and the title of the disclosure are merely used to aid in search of patent files and are not intended to limit the scope of the disclosure.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the invention", "the disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. An illumination system, configured to provide an illumination beam, comprising a light-source module, a first wavelength conversion device, and a second wavelength conversion device, wherein:
   the light-source module is configured to provide a first excitation beam and a second excitation beam,
   the first wavelength conversion device is disposed on a path of the first excitation beam and is disposed to rotate around a first rotating axis, a surface of the first wavelength conversion device perpendicular to the first rotating axis has a plurality of first regions, and at least one first boundary is disposed between the first regions, and
   the second wavelength conversion device is disposed on a path of the second excitation beam and is disposed to rotate around a second rotating axis, a surface of the second wavelength conversion device perpendicular to the second rotating axis has a plurality of second regions, the second regions correspond to the first regions, and at least one second boundary is disposed between the second regions,
   wherein the at least one first boundary gets into the path of the first excitation beam at a first time point, the at least one second boundary gets into the path of the second excitation beam at a second time point, and a delay time exists between the first time point and the second time point, and wherein the first wavelength conversion device is configured to generate a first light beam, the second wavelength conversion device is configured to generate a second light beam and the first light beam and the second light beam are integrated to form the illumination beam during at least one time period, wherein during the at least one time period, one of the plurality of second regions corresponds to one of the plurality of first regions, and the one of the plurality of second regions and the one of the plurality of first regions have a same optical property.

2. The illumination system according to claim 1, wherein the first regions comprise at least one first excitation light reflection region, and the second regions comprise at least one second excitation light reflection region.

3. The illumination system according to claim 1, wherein the light-source module does not emit the first excitation beam at the first time point and does not emit the second excitation beam at the second time point.

4. The illumination system according to claim 1, wherein the first wavelength conversion device and the second wavelength conversion device are phosphor wheels, and rotating speeds of the first wavelength conversion device and the second wavelength conversion device are identical.

5. The illumination system according to claim 1, wherein the first wavelength conversion device and the second wavelength conversion device are disposed on two opposite surfaces of a rotating wheel.

6. The illumination system according to claim 1, wherein colors of first converted beams generated by irradiation performed by the first excitation beam to at least N of the first regions are the same, colors of second converted beams generated by irradiation performed by the second excitation beam to at least N of the second regions are the same, and N is greater than or equal to 2.

7. The illumination system according to claim 1, wherein when the light-source module does not emit one of the first excitation beam and the second excitation beam, intensity of the other one of the first excitation beam and the second excitation beam is increased.

8. The illumination system according to claim 1, further comprising a first light homogenizer and a second light homogenizer, wherein the first light homogenizer is disposed on a path of at least one first converted beam generated by irradiation performed by the first excitation beam to the first regions, and the second light homogenizer is disposed on a path of at least one second converted beam generated by irradiation performed by the second excitation beam to the second regions.

9. The illumination system according to claim 8, further comprising a first dichroic mirror and a second dichroic mirror, wherein the first dichroic mirror is disposed on the paths of the at least one first excitation beam and the first converted beams, and the second dichroic mirror is disposed on the paths of the at least one second excitation beam and the second converted beams.

10. A projection apparatus, comprising the illumination system according to claim 1, a light valve, and a projection lens, wherein
   the light valve is disposed on a path of the illumination beam and is configured to convert the illumination beam into an image beam, and
   the projection lens is disposed on a transmission path of the image beam and is configured to project the image beam out of the projection apparatus.

11. The illumination system according to claim 1, wherein the first light beam comprises a first converted beam or the first excitation beam, and the second light beam comprises a second converted beam or the second excitation beam.

* * * * *